US 8,364,808 B2
Jan. 29, 2013

(12) United States Patent
Shima

(54) DEVICE MANAGEMENT SYSTEM

(75) Inventor: Toshihiro Shima, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 1414 days.

(21) Appl. No.: 11/528,620

(22) Filed: Sep. 28, 2006

(65) Prior Publication Data

US 2007/0073876 A1    Mar. 29, 2007

(30) Foreign Application Priority Data

Sep. 29, 2005 (JP) .................. 2005-285006

(51) Int. Cl.
 G06F 15/173    (2006.01)
 G06F 15/16     (2006.01)
 G06F 11/30     (2006.01)

(52) U.S. Cl. ........ 709/224; 709/203; 709/217; 709/218; 709/219; 709/223; 709/225; 709/226; 709/238; 709/245; 709/246; 709/247; 713/176; 713/187; 713/188; 713/189; 713/190; 713/191; 713/192; 713/193; 713/194; 726/1; 726/2; 726/3; 726/4; 726/5; 726/6; 726/9; 726/10; 726/11; 726/12; 726/13; 726/14; 726/15; 726/16; 726/17; 726/18; 726/19; 726/20; 726/21; 726/26; 726/27

(58) Field of Classification Search .................. 709/219, 709/224, 203, 217, 218, 223, 225, 226, 238, 709/245, 246, 247; 713/176, 193, 201, 187, 713/188, 189, 190, 191, 192, 194; 726/1, 726/2, 3, 4, 5, 6, 9, 10, 11, 12, 13, 14, 15, 726/16, 17, 18, 19, 20, 21, 26, 27
See application file for complete search history.

(56) References Cited

U.S. PATENT DOCUMENTS

| 5,548,648 | A  | * | 8/1996  | Yorke-Smith ............. 713/193 |
| 5,956,404 | A  | * | 9/1999  | Schneier et al. ........... 713/180 |
| 6,567,180 | B1 | * | 5/2003  | Kageyama et al. .......... 358/1.15 |
| 7,076,661 | B2 | * | 7/2006  | Chen et al. ................ 713/178 |
| 7,177,552 | B2 | * | 2/2007  | Koike ....................... 399/12 |
| 7,392,393 | B2 | * | 6/2008  | Taki ........................ 713/176 |
| 7,506,159 | B2 | * | 3/2009  | Shima et al. .............. 713/161 |
| 7,831,825 | B2 | * | 11/2010 | Milliken et al. ........... 713/160 |
| 2002/0041684 | A1 | * | 4/2002 | Nishioka .................... 380/30 |
| 2002/0064280 | A1 | * | 5/2002 | Gassho ..................... 380/201 |
| 2002/0120838 | A1 | * | 8/2002 | Abdulkader ............... 713/153 |
| 2002/0150114 | A1 | * | 10/2002 | Sainomoto et al. ......... 370/402 |
| 2003/0105963 | A1 | * | 6/2003 | Slick et al. ................ 713/171 |

(Continued)

FOREIGN PATENT DOCUMENTS

| JP | 11-134057    | 5/1999 |
| JP | 2003-22008 A | 1/2003 |

(Continued)

*Primary Examiner* — John Follansbee
*Assistant Examiner* — Saket K Daftuar

(57) ABSTRACT

A device management system for managing a device based on management information is presented. The system includes a device monitoring unit for obtaining management information from a device, a relay server coupled to the device monitoring unit over a network, and a management server, coupled to the relay server over a network, configured to manage the device based on the management information. The device monitoring unit obtains the management information from the device and transmits the obtained management information without encryption. Upon receiving the management information, the relay server encrypts and transmits to the management server the received management information.

8 Claims, 8 Drawing Sheets

U.S. PATENT DOCUMENTS

| | | | |
|---|---|---|---|
| 2003/0131228 A1* | 7/2003 | Twomey | 713/153 |
| 2004/0039911 A1* | 2/2004 | Oka et al. | 713/175 |
| 2004/0054962 A1* | 3/2004 | Shima et al. | 715/500 |
| 2004/0098592 A1* | 5/2004 | Taki | 713/176 |
| 2004/0107348 A1* | 6/2004 | Iwamura | 713/176 |
| 2004/0125402 A1* | 7/2004 | Kanai et al. | 358/1.15 |
| 2004/0172469 A1* | 9/2004 | Takahashi et al. | 709/224 |
| 2004/0249759 A1* | 12/2004 | Higashi et al. | 705/59 |
| 2005/0149755 A1* | 7/2005 | Shima et al. | 713/201 |
| 2005/0160269 A1* | 7/2005 | Akimoto | 713/171 |
| 2005/0180764 A1* | 8/2005 | Koike | 399/12 |
| 2005/0207580 A1* | 9/2005 | Milliken et al. | 380/256 |
| 2005/0210242 A1* | 9/2005 | Troxel et al. | 713/160 |
| 2005/0273843 A1* | 12/2005 | Shigeeda | 726/5 |
| 2005/0277405 A1* | 12/2005 | Noguchi | 455/411 |
| 2005/0289346 A1* | 12/2005 | Minagawa | 713/171 |
| 2006/0075460 A1* | 4/2006 | Anegawa et al. | 726/1 |
| 2006/0136749 A1* | 6/2006 | Satou et al. | 713/193 |
| 2006/0149683 A1* | 7/2006 | Shimojima et al. | 705/59 |
| 2006/0165456 A1* | 7/2006 | Matsunaga et al. | 400/62 |
| 2006/0279773 A1* | 12/2006 | Sakurai et al. | 358/1.15 |
| 2007/0055865 A1* | 3/2007 | Kakii | 713/156 |
| 2007/0247985 A1* | 10/2007 | Ueda et al. | 369/47.1 |
| 2008/0267402 A1* | 10/2008 | Kimura | 380/243 |
| 2009/0193521 A1* | 7/2009 | Matsushima et al. | 726/22 |

FOREIGN PATENT DOCUMENTS

| | | |
|---|---|---|
| JP | 2004-185351 A | 7/2004 |
| JP | 2005-173864 A | 6/2005 |

\* cited by examiner

DEVICE MANAGEMENT SYSTEM

CROSS REFERENCE TO RELATED APPLICATIONS

The present application claims the priority based on Japanese Patent Application No. 2005-285006 filed on Sep. 29, 2005, the disclosure of which is hereby incorporated by reference in its entirety.

BACKGROUND OF THE INVENTION

1. Field of the Invention

The present invention relates to a device management system in which a device is connected to a management server that manages such device over a network.

2. Description of the Related Art

In recent years, in tandem with the development of networks such as local area networks and the Internet, device management systems are becoming increasingly popular in which a device is connected to a management server that manages such device over a network. In such a device management system, the management server receives from the device, as information used to manage the device (management information) over the network, a failure alert or an indication that only a low quantity of a consumable used in the device remains, and manages the device based on such information.

As such a device management system, a system in which multiple devices such as printers or scanners are connected over both a LAN and the Internet to the management server has been disclosed (see JP11-134057A, for example).

Using the device management system in which a device is connected to a management server that manages such device over a network described above, device management services such as maintenance services and fee-charging services can be implemented.

Specifically, where a failure alert is received over the network by a management server disposed at a monitoring location from a device disposed at a user location, a party who provides device management services (termed a 'service provider' below) can supply maintenance services based on this management information to repair the device failure or replace the device experiencing failure. If the device is a printer, for example, the service provider can receive from the management server management information such as the number of copies printed or the amount of remaining toner, and provide fee-charging services to charge for the use of the printer according to the use thereof based on such management information.

Because the management information is transmitted over a network in connection with such device management services, there is a risk that the information may be tapped or tampered with by a third party. Accordingly, a system configuration has been envisioned in which the service provider prepares a cryptographic key used for encryption on the device and a cryptographic key used for decryption by the management server, the device transmits the management information to the management server after encrypting it using this key, and the management server obtains the management information by decrypting the received information.

However, in such a configuration, because only the management server can decrypt encrypted management information, from the user's standpoint, since information that cannot be read by the user himself is transmitted to the management server, the user may become concerned that information other than management information, particularly confidential personal information, may be transmitted to the management server.

For example, where the device is a printer, in the event a confidential document is to be printed, there is a possibility that the print job data for such confidential document will be transmitted from the printer to the management server, causing concern to the user.

SUMMARY OF THE INVENTION

An object of the present invention is to provide a technology that enables the user to check information transmitted from a device to the management server and prevent unauthorized acquisition or tampering with respect to management information in a device management system.

According to an aspect of the present invention, a device management system for managing a device based on management information is provided. The system includes a device monitoring unit for obtaining management information from a device, a relay server coupled to the device monitoring unit over a network, and a management server, coupled to the relay server over a network, configured to manage the device based on the management information. The device monitoring unit obtains the management information from the device and transmits the obtained management information without encryption. Upon receiving the management information, the relay server encrypts and transmits to the management server the received management information.

Since the device monitoring unit transmits management information obtained from the device to the relay server without encrypting it, the user can determine whether confidential information other than management information has been transmitted from the device monitoring unit to the relay server by obtaining over the network the information transmitted from the device monitoring unit to the relay server. Furthermore, because the relay server encrypts the received information before sending it to the management server, unauthorized acquisition of the management information by a third party can be prevented in the network comprising the relay server and the management server.

The present invention is not limited to a device invention that includes the above device management system, device monitoring unit and relay server, and may be implemented as a method invention comprising a management information transmission method. Furthermore, the present invention may be implemented in various forms, such as in the form of a computer program comprising such method and devices, the form of a storage medium on which such computer program is recorded, or in the form of data encoded in a carrier wave that includes this computer program.

Where the present invention is implemented in the form of a computer program or a storage medium on which such computer program is recorded, such program may comprise the entire program that controls the device management system, device monitoring unit and relay server, or it may comprise only the parts thereof that implement the functions of the present invention. The storage medium may comprise a ROM cartridge, punch card, printed matter on which symbols such as a bar code or other symbols are printed, a computer internal storage device (such as a RAM or ROM) or any of various types of computer-readable media such as an external storage device.

DESCRIPTION OF THE PREFERRED EMBODIMENT

Preferred embodiments of the present invention will be described below in the following sequence.

A. Embodiment
A1. System Summary
A2. Detailed Sequence of Management Information Transmission Process and Management Information Relay Process
A3. Effect of the Embodiment
B. Variations

A. Embodiment

A1. System Summary

Figure 1:
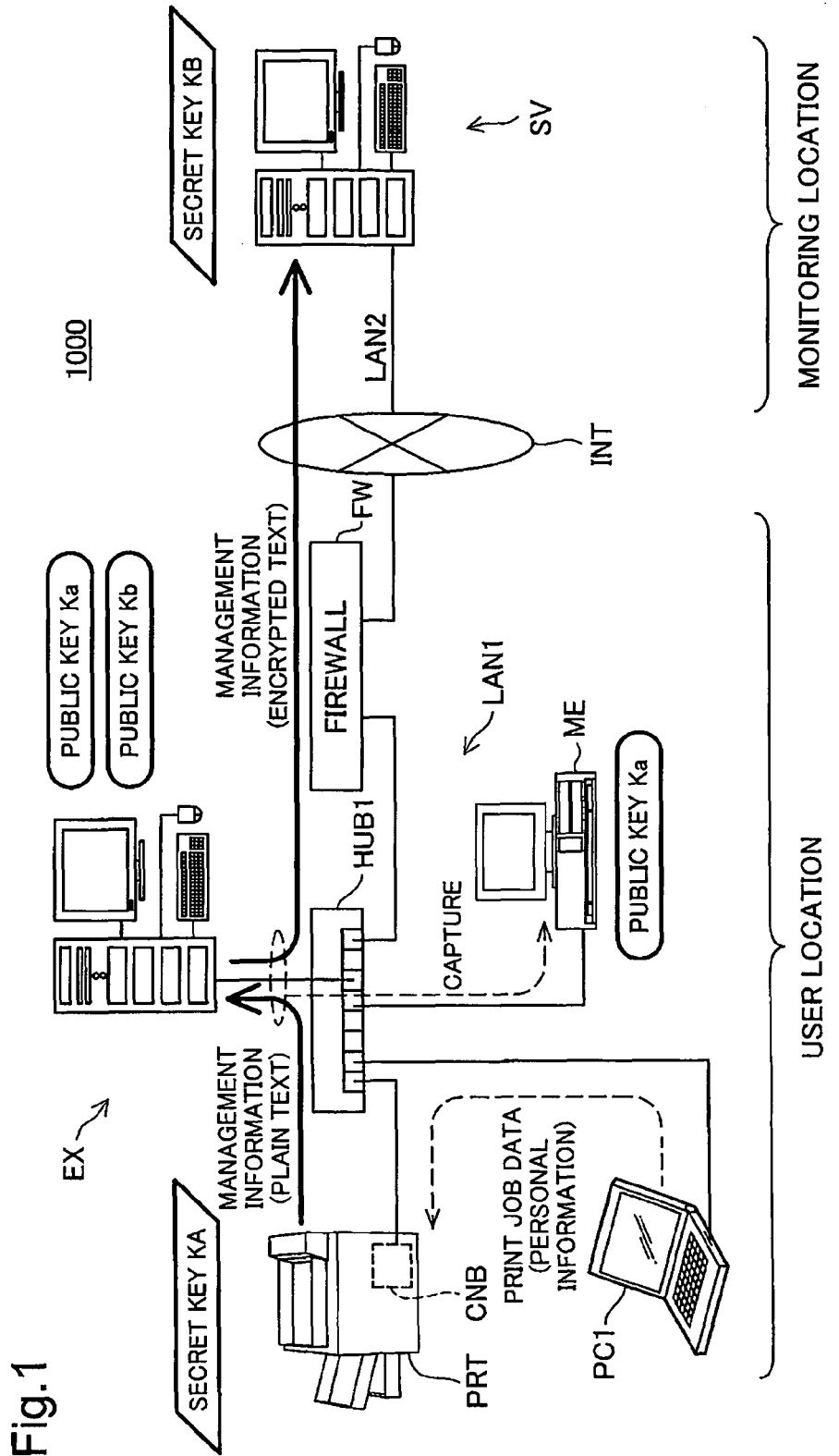
FIG. 1 shows the basic construction of a device management system comprising an embodiment of the present invention.

FIG. 1 shows the basic construction of a device management system comprising an embodiment of the present invention. The device management system 1000 shown in FIG. 1 has a printer PRT, a relay server EX, a monitoring device ME, a firewall FW, a repeater hub HUB1, which are installed at a user location, and a management server SV installed at a monitoring location.

The printer PRT includes a custom network board CNB that is connected over a LAN cable to the repeater hub HUB1. The relay server EX, monitoring device ME and firewall FW also each include a separate network board (not shown), each of which is connected to the repeater hub HUB1 via a LAN cable.

The network boards respectively containing the custom network board CNB, the relay server EX and the like each have a preset unique MAC (Media Access Control) address.

The printer PRT, relay server EX, monitoring device ME and firewall FW are connected to the repeater hub HUB1 to construct a local area network LAN1 that is coupled to the Internet INT via the firewall FW.

The local area network LAN1 uses the media access control method set forth in IEEE (Institute of Electrical and Electronic Engineers) standard 802.3, and the communication data transmitted between the devices is sent and received while stored in a MAC frame.

Specifically, the MAC frame sent from each device is relayed to all devices connected to the repeater hub HUB1 by the repeater hub HUB1. Each device then checks the recipient MAC address of the arriving MAC frame, and if the MAC address matches the MAC address of the device itself, it stores this MAC frame in memory, while if there is no match, it discards the MAC frame. The MAC frame corresponds to the data packet recited in the claims.

At the monitoring location, the management server SV is coupled to a local area network LAN2, which is coupled to the Internet INT.

In the device management system 1000, the TCP/IP protocol is used as the communication protocol, and a static IP address is assigned in advance to each device (strictly speaking, to the custom network board CNB and to each network board included in each device).

In the device management system 1000, the management information possessed by the printer PRT is transmitted to the management server SV, which performs management of the printer PRT accordingly. In the printer PRT, the management information possessed thereby is obtained by the custom network board CNB and transmitted to the management server SV via the relay server EX.

The service provider supplies management services to the printer PRT using this device management system 1000.

Specifically, upon receiving via the management server SV management information pertaining to a failure, such as a failure alert, transmitted from the custom network board CNB, the service provider may fix the problem or replaces the failing printer based on the received management information. In addition, upon receiving via the management server SV management information transmitted from the custom network board CNB such as information regarding the status of consumables, such as the amount of remaining toner, or the number of sheets printed, the service provider may charge a fee in accordance with the status of use of the printer PRT based on the received management information.

In order to eliminate unauthorized access from an external device over the Internet INT, the firewall FW is configured to discard connection requests, received over the Internet INT, to each device connected to the local area network LAN1. Accordingly, in the device management system 1000, the relay server EX sends a connection request to the management server SV, and management information is sent to the management server SV after a connection with the management server SV is established.

Figure 2:
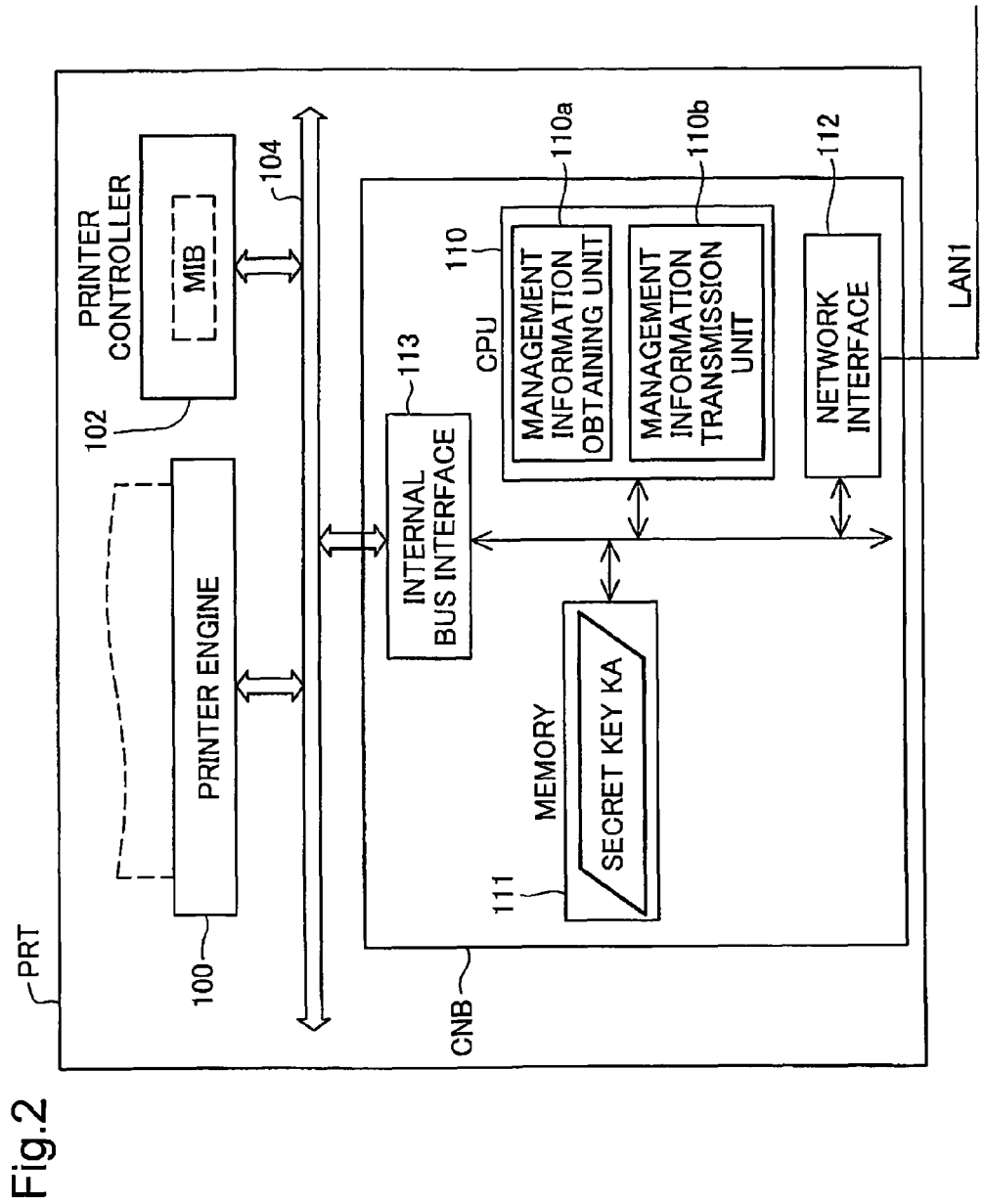
FIG. 2 shows the basic construction of the printer PRT shown in FIG. 1.

FIG. 2 shows the basic construction of the printer PRT shown in FIG. 1.

The printer PRT includes a printer engine 100, a printer controller 102 and the custom network board CNB, each of which is connected via an internal bus 104.

The printer engine 100 comprises various hardware that carry out printing onto paper, such as a toner cartridge, photosensitive drum and the like (not shown). The printer controller 102 is a controller that has a CPU, memory and the like (not shown), and executes printing by controlling the printer engine 100 based on print job data received over the local area network LAN1.

The printer controller 102 collects various information pertaining to the printer PRT such as the amount of toner remaining in the printer engine 100, failure information or the amount of memory used in the printer controller 102, and stores such information in MIB (Management Information Base) format in an internal memory. Standardized information pertaining to the printer and information specified by the manufacturer are defined using this MIB.

The custom network board CNB includes a CPU 110, memory 111, network interface 112 and internal bus interface 113, each of which is connected via an internal bus.

The network interface 112 is connected to the local area network LAN1. The internal bus interface 113 is connected the internal bus 104 which is coupled to the printer engine 100 and the printer controller 102, and also connected to the internal bus on the custom network board CNB.

A secret key KA is pre-stored in the memory 111. This secret key KA is used during public key encryption. The secret key KA may be set by an installation worker from the service provider during installation of the printer PRT using a configuration computer connected to the printer PRT. The secret key KA is not disclosed to the user.

Computer programs for transmitting management information are stored in the memory 111. The CPU functions as a management information obtaining unit 110a, and a management information transmission unit 11b by executing the computer programs.

The custom network board CNB corresponds to the device monitoring unit in the claims, the secret key KA corresponds to the first key in the claims, the management information obtaining unit 110a corresponds to the obtaining unit in the claims, and the management information transmission unit 110b corresponds to the transmission unit in the claims.

Figure 3:
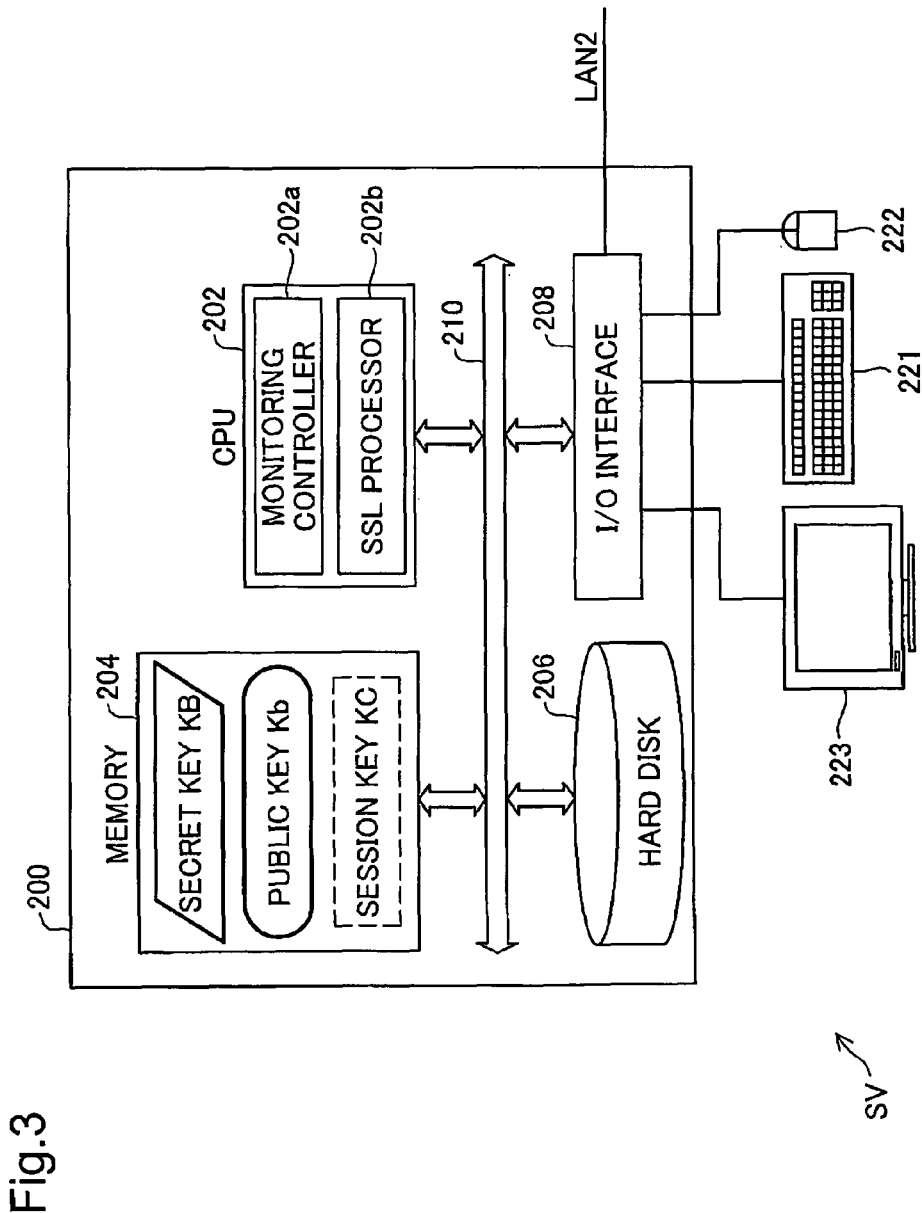
FIG. 3 shows the basic construction of the management server SV shown in FIG. 1.

FIG. 3 shows the basic construction of the management server SV shown in FIG. 1.

The management server SV comprises a computer 200, which includes a CPU 202, memory 204, hard disk 206 and I/O interface 208, each of which is connected to an internal bus 210. The management server SV includes a keyboard 221 and mouse 222 that serve as data input devices, as well as a display 223 that serves as an image output device.

The I/O interface 208 comprises a group of interfaces that enable the keyboard 221, mouse 222, display 223 and local area network LAN1 to be connected to the computer 200.

On the computer 200, application programs are executed under a prescribed operating system. Various drivers that control the keyboard 221, mouse 222 and display 223 are installed as part of this operating system.

The CPU 202 functions as a monitoring controller 202a and an SSL processor 202b via the execution of the application programs.

A secret key KB and public key Kb are pre-stored in the memory 204. The secret key KB is used for public key encryption, and is different from the secret key KA stored on the custom network board CNB. The public key Kb is paired with the secret key KB. The public key Kb and secret key KB are set by a worker from the service provider using the keyboard 221 and mouse 222 and are stored in the memory 204.

Figure 4:
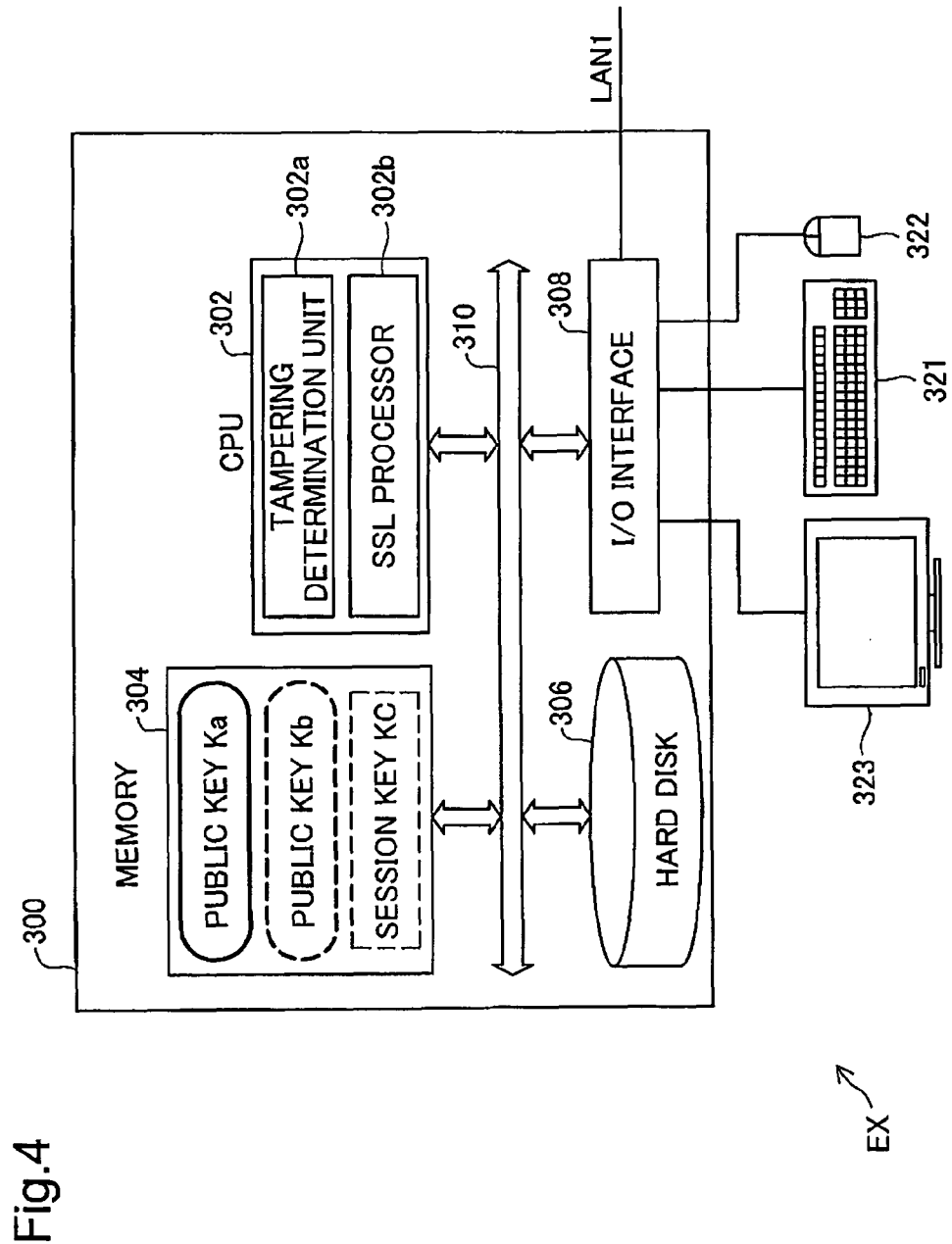
FIG. 4 shows the basic construction of the relay server EX shown in FIG. 1.

FIG. 4 shows the basic construction of the relay server EX shown in FIG. 1.

The relay server EX comprises a computer 300, which includes mainly a CPU 302, memory 304, hard disk 306 and I/O interface 308, each of which is connected to an internal bus 310. The relay server EX includes a keyboard 321 and mouse 322 that serve as data input devices, as well as a display 323 that serves as an image output device.

The I/O interface 308 comprises a group of interfaces that enable the keyboard 321, mouse 322, display 323 and local area network LAN1 to be connected to the computer 300.

On the computer 300, application programs are executed under a prescribed operating system. Various drivers that control the keyboard 321, mouse 322 and display 323 are installed as part of this operating system.

The CPU 302 functions as a tampering determination unit 302a and an SSL processor 302b via the execution of the application programs.

A public key Ka is pre-stored in the memory 304. The public key Ka is used for public key encryption and paired with the secret key KA stored on the custom network board CNB in the printer PRT. The public key Ka is set during installation of the relay server EX by a worker from the service provider using the keyboard 321 and mouse 322, and is stored in the memory 304. The public key Ka is disclosed to the user.

The tampering determination unit 302a corresponds to the receiving unit in the claims, the SSL processor 302b corresponds to the encryption processor in the claims, and the public key Ka corresponds to the second key in the claims.

Figure 5:
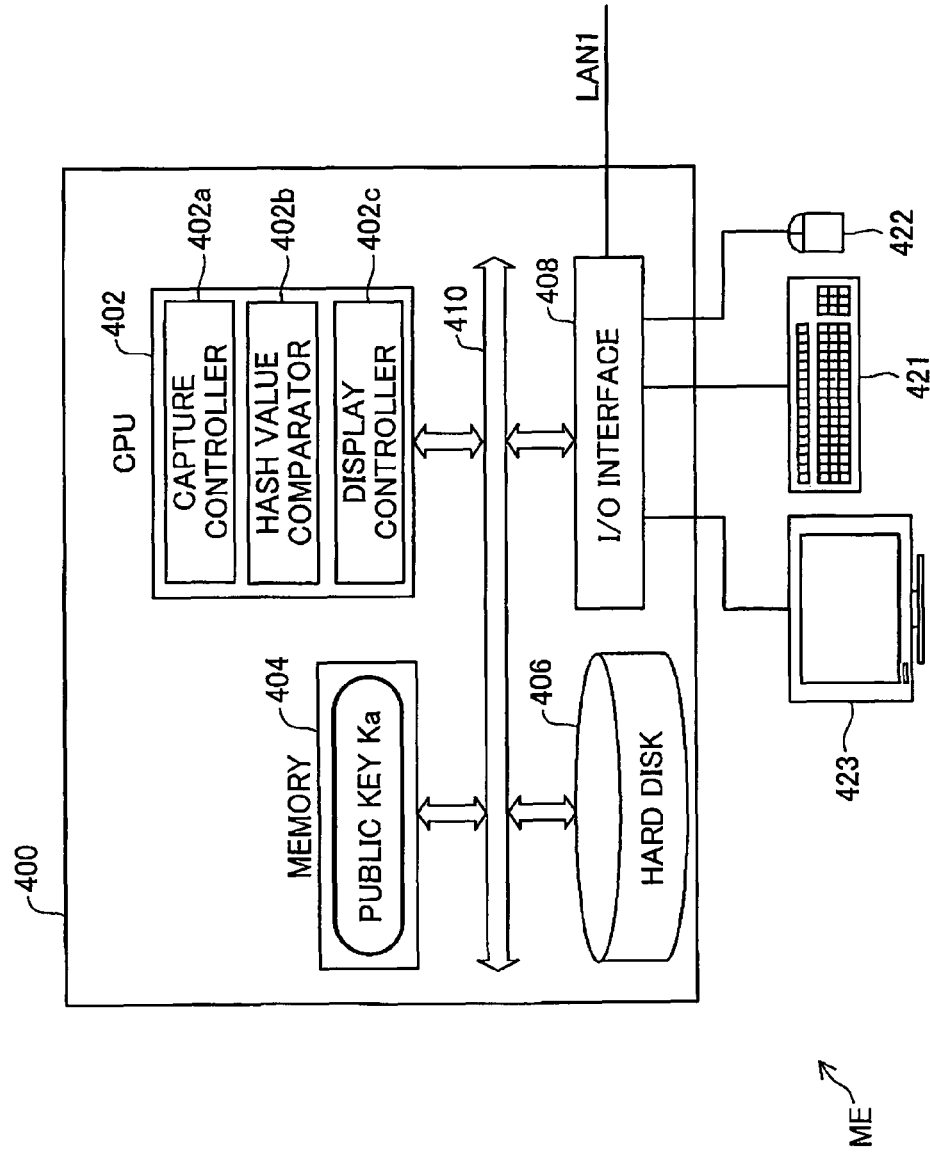
FIG. 5 shows the basic construction of the monitoring device ME shown in FIG. 1.

FIG. 5 shows the basic construction of the monitoring device ME shown in FIG. 1.

The monitoring device ME captures the MAC frames traveling over the local area network LAN1 and obtains information included in the captured MAC frames.

This monitoring device ME comprises a computer 400, which includes a CPU 402, memory 404, hard disk 406 and I/O interface 408, each of which is connected to an internal bus 410. The monitoring device ME also includes a keyboard 421 and mouse 422 that serve as data input devices, as well as a display 423 that serves as an image output device.

The I/O interface 408 comprises a group of interfaces that enable the keyboard 421, mouse 422, display 423 and local area network LAN1 to be connected to the computer 400.

On the computer 400, application programs for capturing MAC frames are executed under a prescribed operating system. Various drivers that control the keyboard 421, mouse 422 and display 423 are installed as part of this operating system.

The CPU 402 functions as a capture controller 402a, hash value comparator 402b, and display controller 402c via the execution of this application programs.

The public key Ka is pre-stored in the memory 404. The public key Ka is identical to the public key Ka stored on the relay server EX, and paired with the secret key KA stored on the custom network board CNB in the printer PRT. As described above, the public key Ka is disclosed to the user, is set by the user in advance via the keyboard 421 and mouse 422, and is stored in the memory 404.

In the device management system 1000 described above, the printer PRT receives print job data from the personal computer PC1 connected to the repeater hub HUB1 and executes printing, as shown in FIG. 1. The user may become concerned that the print job data might be transmitted from the printer PRT to the management server SV in addition to the management information. Furthermore, because the management information is transmitted over the Internet INT, there is a danger that the management information will be accessed by a third party over the Internet INT.

Accordingly, in the device management system 1000, the management information transmission process and management information relay process described below enable the user to check the information transmitted from the custom network board CNB to the relay server EX and prevent a third party from tampering with or accessing the management information.

A2. Detailed Sequence of Management Information Transmission Process and Management Information Relay Process In order to execute the management information transmission process and management information relay process, the management information obtaining unit 110a in the printer PRT shown in FIG. 2 obtains management information from the MIB stored in the memory (not shown) included in the printer controller 102 and stores the management information in the memory 111. Once the management information is stored in the memory 111, the management information transmission process is begun on the custom network board CNB.

Figure 6:
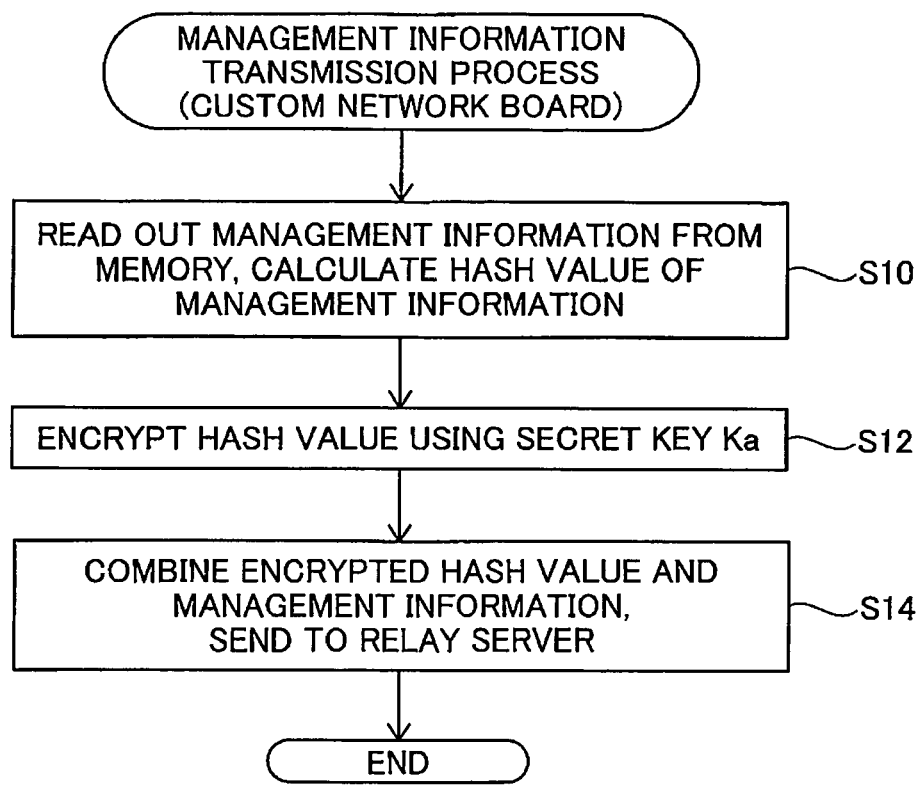
FIG. 6 is a flow chart showing the sequence of operations of the management information transmission process executed on the custom network board CNB.

FIG. 6 is a flow chart showing the sequence of the management information transmission process executed on the custom network board CNB.

When the management information transmission process is begun, the management information transmission unit 110b shown in FIG. 2 reads the management information out from the memory 111, calculates a hash value of the management information using a prescribed hash function such as Message Digest 5, and stores the hash value in the memory 111 (step S10).

The management information transmission unit 110*b* then encrypts the hash value using the secret key KA and stores the encrypted hash value in the memory 111 (step S12). This encrypted hash value corresponds to the tampering assurance information in the claims.

The management information transmission unit 110*b* then combines the management information and the encrypted hash value, and transmits the combined data to the relay server EX via the network interface 112 (step S14).

As a result of the above management information transmission process, plain text management information and an encrypted hash value are transmitted from the custom network board CNB to the relay server EX. The user can then, using the monitoring device ME, check the information sent from the custom network board CNB to the relay server EX.

Specifically, on the monitoring device ME shown in FIG. 5, the capture controller 402*a* stores in the memory 404 all of the MAC frames relayed from the repeater hub HUB1. The capture controller 402*a* then extracts from these MAC frames those MAC frames in which the sender MAC address and recipient MAC address match the MAC address of the custom network board CNB and the MAC address of the relay server EX, respectively, obtains the information stored in these MAC frames, and stores such information in the memory 404.

As a result, the information sent by the custom network board CNB to the relay server EX is stored in the memory 404 and the display controller 402*c* reads this information from the memory 404 and displays it on the display 423.

Because the management information is plain-text information, the user can check whether or not information other than the management information and the encrypted hash value has been sent from the custom network board CNB to the relay server EX simply by looking at the information displayed on the display 423.

However, because the encrypted hash value portion of the information displayed on the display 423 is encrypted, the user cannot read this encrypted hash value portion, and may become concerned that confidential information might be included in this portion.

Accordingly, the hash value comparator 402*b* reads out from the memory 404 the public key Ka and the encrypted hash value, decrypts the encrypted hash value using the public key Ka and stores the result in the memory 404. At the same time, the hash value comparator 402*b* reads out the received management information from the memory 404, calculates a hash value of the management information using the same hash function (MD5) as used by the custom network board CNB, and stores the result in the memory 404.

The hash value comparator 402*b* then reads the decrypted hash value from the memory 404 and the calculated hash value, determines whether or not the two hash values match, and stores the result of this determination in the memory 404. The display controller 402*c* then reads this determination result from the memory 404 and displays it on the display 423.

Here, if the information on which the hash value calculation was based is different, the hash value calculated using the same hash function will be different. Therefore, if it is displayed that a match exists as the result of the determination above, this means that the encrypted hash value is the value resulting from encryption of the hash value calculated based on the management information, while if it is displayed that a match does not exist, this means that the encrypted hash value is a value encrypted using information other than the hash value calculated using the management information.

Therefore, the user can check whether or not the encrypted hash value portion includes information other than the hash value calculated based on the management information simply by seeing the above determination result displayed on the display 423.

Meanwhile, on the relay server EX shown in FIG. 4, the I/O interface 308 receives the plain-text management information and encrypted hash value transmitted from the custom network board CNB and stores them in the memory 304. Once the plain-text management information and encrypted hash value are stored in the memory 304, the management information relay process is begun on the relay server EX.

Figure 7:
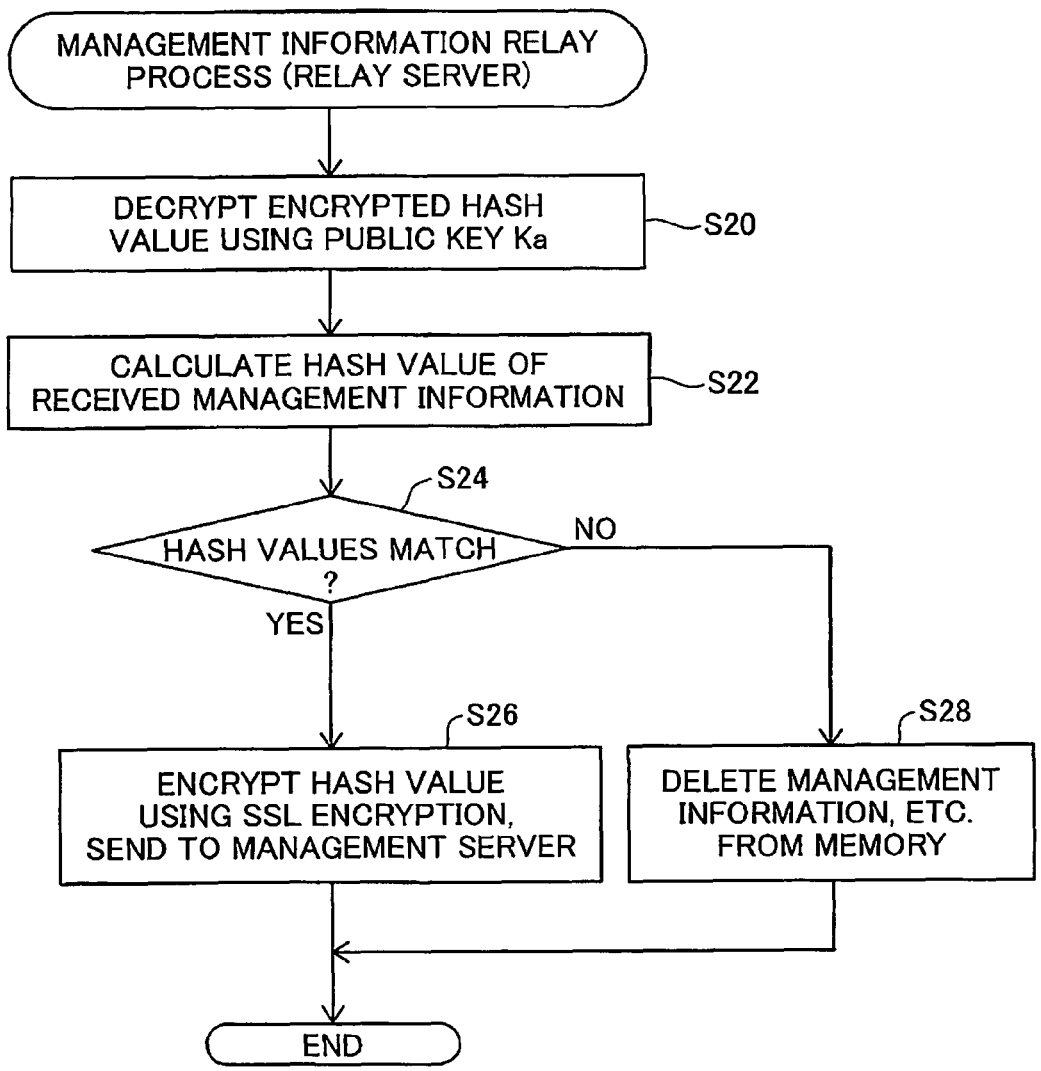
FIG. 7 is a flow chart showing the sequence of operations of the management information relay process executed on the relay server EX.

FIG. 7 is a flow chart showing the sequence of operations of the management information relay process executed on the relay server EX.

When the management information relay process is begun, the tampering determination unit 302*a* decrypts the encrypted hash value using the public key Ka, and stores the result in the memory 304 (step S20).

The tampering determination unit 302*a* then calculates a hash value of the management information using the same hash function as that used by the custom network board CNB, and stores the result in the memory 304 (step S22).

The tampering determination unit 302*a* next reads out the decrypted hash value and the hash value calculated in step S22 and determines whether or not the two hash values match (step S24).

Here, because the hash value calculated based on the non-tampered management information and the hash value calculated based on the tampered management information are calculated based on different information, different values result even if the same hash function is used. Therefore, the tampering determination unit 302*a* can determine whether or not the management information has been tampered with by determining whether or not the decrypted hash value and the calculated hash value match.

Because the management information is transmitted as plain-text information as described above, it may be easily tampered with by a third party who obtains the management information. This is the reason that this determination of whether the management information has been tampered with is carried out.

It is possible that a third party would tamper with the obtained management information, encrypt the hash value calculated based on the tampered-with management information using the public key Ka (but not the secret key KA), and send this encrypted hash value to the relay server EX together with the tampered management information with the purpose of creating a 'match exists' determination in the processing of step S24 described above.

However, because the information encrypted using the public key Ka can be decrypted only by the secret key KA, the hash value encrypted by the public key Ka cannot be decrypted into the original hash value on the relay server EX, which does not possess the secret key KA, and is decrypted (calculated) as a different value. As a result, the processing of step S24 results in a determination that the hash values do not match.

Returning to FIG. 7, if it is determined that a match does not exist in step S24, the tampering determination unit 302*a* discards the management information and encrypted hash value, as well as the decrypted hash value and the hash value calculated in step S22 (step S28).

At the same time, if it is determined in step S24 that a match exists, the SSL processor 302*b* establishes a connection between the relay server EX and the management server SV, encrypts the management information stored in the memory 304 using Secure Socket Layer (SSL) encryption, and transmits the result to the management server SV (step S26). This SSL encryption is an encryption protocol standardized by the IETF (Internet Engineering Task Force).

Specifically, the SSL processor 302b obtains the public key Kb from the management server SV and stores it in the memory 304, as well as generates a session key KC to be used by it and the management server SV and stores the session key KC in the memory 304. The SSL processor 302b then encrypts the generated session key KC using the public key Kb and sends the result to the management server SV. The SSL processor 302b next encrypts the management information using the session key KC, and transmits the result to the management server SV via the I/O interface 308.

As a result of the management information relay process described above, the management information is sent from the relay server EX to the management server SV over the Internet INT in an encrypted state. Therefore, third party access of the management information over the Internet INT can be prevented.

On the management server SV shown in FIG. 3, the SSL processor 202b uses the session key KC to decrypt the encrypted management information sent from the relay server EX. The monitoring controller 202a then stores the decrypted management information on the hard disk 206.

A3. Effect of the Embodiment

In the device management system 1000, because a hash value calculated based on the plain-text management information is encrypted and sent to the relay server EX together with the management information, it can be determined on the relay server EX whether or not the management information has been tampered with by calculating a hash value based on the received management information and determining whether or not this calculated hash value matches the value resulting from decryption of the received encrypted hash value.

Because the management information sent from the custom network board CNB is plain-text information and the monitoring device ME may obtain and display the information sent from the custom network board CNB to the relay server EX, the user can check whether or not information other than the management information and the encrypted hash value has been sent from the custom network board CNB to the relay server EX simply by looking at the displayed information.

Furthermore, because the public key Ka paired with the secret key KA stored on the custom network board CNB is public to the user, the user can decrypt the encrypted hash value on the monitoring device ME by configuring this public key Ka on the monitoring device ME in advance. In addition, because it is determined on the monitoring device ME whether or not the hash value calculated based on the received management information and the received encrypted hash value match and the result of this determination is displayed on the display 423, the user can check whether or not confidential information is included in the displayed encrypted hash value simply by looking at such result.

On the relay server EX, the plain-text management information received from the custom network board CNB is encrypted using SSL encryption and transmitted to the management server SV. Therefore, third-party access of the management information via the Internet INT can be prevented.

In the device management system 1000, the only encryption key disclosed to the user is the open public key Ka. Because the secret keys KA and KB are not disclosed to the user, acquisition of the secret keys KA and KB by a third party can be prevented, and the risk of a compromise of the security of the device management system 1000 via spoofing using these secret keys KA and KB can be prevented as well.

B. Variations

The present invention is not limited to the embodiment and examples described above, and may be implemented in various forms within the essential scope thereof. For example, possible variations of the present invention are described below.

B1. Variation 1

In the above embodiment, because the local area network LAN1 is formed using the repeater hub HUB1, the print job data sent from the personal computer PC is relayed to all devices connected to the repeater hub HUB1. Because the print job data is also relayed to the relay server EX, the relay server EX can also take in this print job data and transmit it to the management server SV.

In another embodiment, by forming the local area network LAN1 using a switching hub (Layer 2 switch) instead of a repeater hub, the print job data sent from the personal computer PC may be relayed by the switching hub to only the printer PRT, thereby preventing the relay server EX from acquiring the print job data.

However, in this construction as well, the broadcast frames sent from the personal computer PC (i.e., the MAC frames for which the recipient MAC address is the broadcast address) are relayed to all connected devices in the switching hub. Therefore, the user may have a concern that the print job data will be relayed to the relay server EX as these broadcast frames.

Therefore, it is preferred that the local area network be divided into two sub-networks, that two ranges (broadcast domains) be prepared to receive these broadcast frames, and that the printer PRT (custom network board CNB) and relay server EX be allocated to separate broadcast domains.

Figure 8:
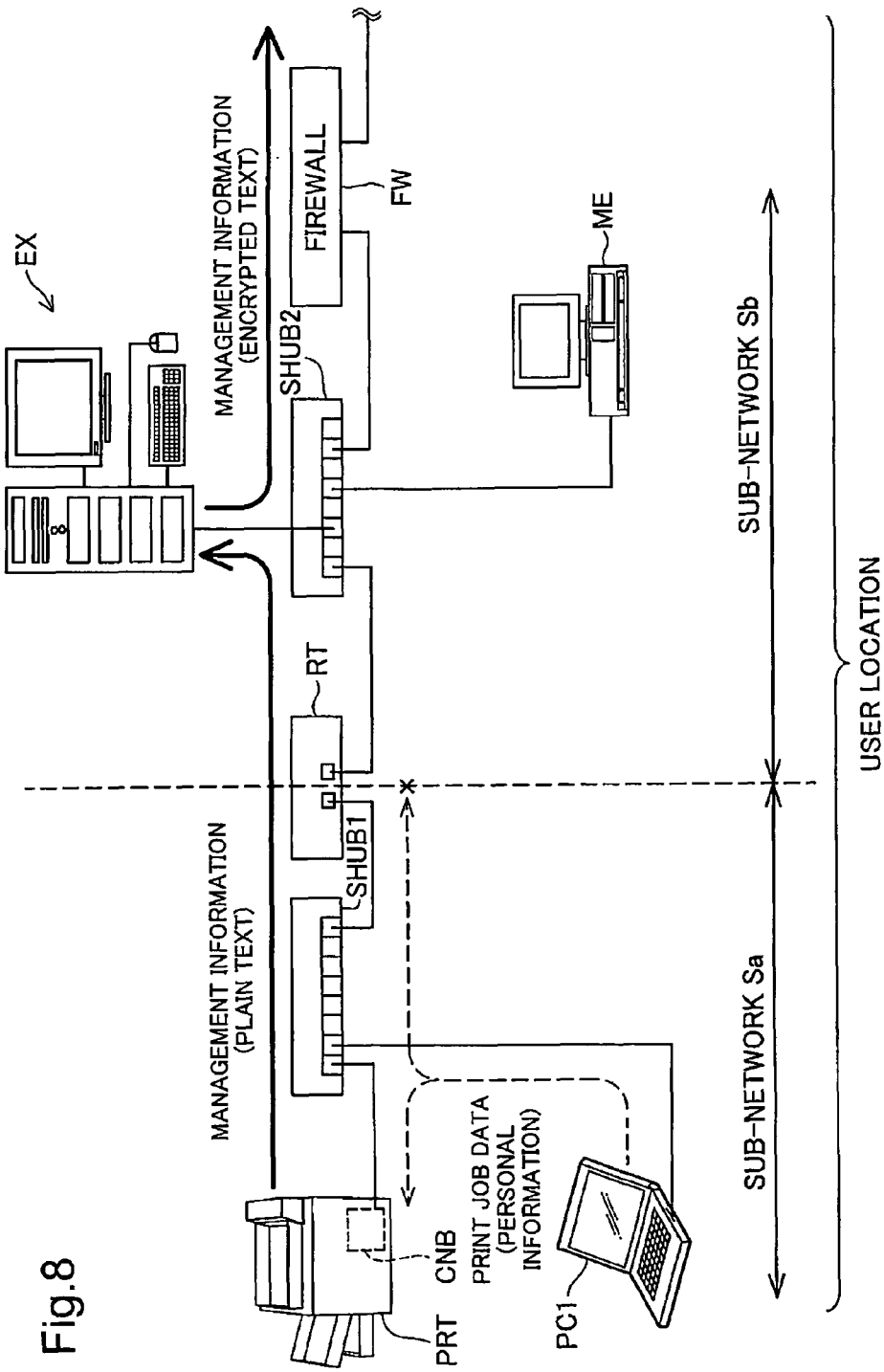
FIG. 8 shows the basic construction of a device management system according to Variation 1.

FIG. 8 shows the basic construction of the device management system according to the alternative construction. In FIG. 8, only the construction at the user location is shown, and the construction at the monitoring location is omitted, being identical to that shown in FIG. 1.

At the user location, the printer PRT and personal computer PC are connected to a switching hub SHUB1, and the relay server EX, firewall FW and monitoring device ME are connected to a switching hub SHUB2. The switching hub SHUB1 and switching hub SHUB2 are connected via a router RT.

In this construction, the local area network LAN1 is divided into a sub-network Sa to which the printer PRT (custom network board CNB) and personal computer PC1 belong, and a sub-network Sb to which the relay server EX, monitoring device ME and firewall FW belong. The router RT belongs to both of the sub-networks Sa, Sb.

Here, because the router RT does not relay the broadcast frames, the sub-networks Sa, Sb each comprise a broadcast domain. With this construction, the broadcast frames sent from the personal computer PC1 no longer reach the relay server EX.

However, the print job data may be sent from the personal computer PC1 to the relay server EX not via broadcasting but via unitext transmission (i.e. data transmission sent to a specified individual).

Accordingly, in the router RT, it is preferred that a configuration be implemented whereby the relaying (routing) of the data (IP packets) from the sub-network Sa to the sub-network Sb is permitted only for IP packets addressed to the relay server EX from the custom network board CNB, and that the relaying of data from the sub-network Sb to the sub-network Sa is completely prohibited.

Using this construction, unitext transmission of the print job data from the personal computer PC1 to the relay server EX can be prevented, and the acquisition (pull) of print job data or other information by the relay server EX from the printer PRT or personal computer PC1 can also be prevented. As a result, the only information reaching the relay server EX comprises the plain-text management information and encrypted hash value sent by the custom network board CNB.

Furthermore, with this construction, the sub-network Sb functions as a so-called Demilitarized Zone (DMZ), and even if there is an unauthorized breach of the relay server EX from the Internet, an unauthorized breach of the printer PRT or personal computer PC1 via the relay server EX can be prevented.

In the construction shown in FIG. 8, the above effects may be obtained even where two repeater hubs are used in lieu of the switching hubs SHUB1, SHUB2.

B2. Variation 2

In the above embodiment, if it is determined in step S24 of the management information relay process that the decrypted hash value does not match the hash value calculated in step S22, the tampering determination unit 302*a* executes the processing of step S28 and deletes the management information and the like from the memory 304, but the present invention is not limited to this implementation.

If it is determined in step S24 that a match does not exist, it is acceptable if, instead or in addition to the processing of step S28, information indicating that tampering has occurred is sent to the management server SV. In this case, the management server SV can learn that the management information has been tampered with.

Furthermore, specific secrecy definition data may be pre-stored in the memory 304 of the relay server EX that defines confidential information such as a name, telephone number or other text string. In this case, where it is determined in step S24 that a match does not exist, it is acceptable if, instead of the processing of step S28, the received information may be compared with the secrecy definition data.

Where part of the received information matches the secrecy definition data, the information stored in the MAC frames that include this matching part (the confidential information part) is completely deleted, and the information stored in other MAC frames may be processed in accordance with step S26 and sent to the management server SV. Alternatively, where a part of the received information matches the secrecy definition data, it is acceptable if only that matching part is deleted and the remaining information is transmitted to the management server SV.

On the relay server EX, it is acceptable if the plain-text management information and encrypted hash value received from the custom network board CNB are sent via SSL encryption to the management server SV without being checked for tampering and the tampering check is carried out on the management server SV.

B3. Variation 3

In the above embodiment, the information combined and transmitted with the plain-text management information in order to check for the existence of tampering of the management information is an encrypted hash value comprising the hash value calculated based on the management information and encrypted using the secret key KA, but rather than this encrypted hash value, it is acceptable if encrypted information is obtained by encrypting the entire management information using the secret key KA, and sent together with the plain-text management information.

Using this construction, where the plain-text management information has been tempered, the tampered plain-text management information and the management information obtained via decryption of the encrypted management information using the public key Ka are different. Therefore, it can be checked on the relay server EX whether tampering has occurred by comparing the received management information and the decrypted management information.

Alternatively, it is acceptable if the packet numbers (assigned in ascending order starting with the number '1') of the IP packets (or TCP packets) in which the management information is stored are encrypted using the secret key KA and these encrypted packet numbers are combined and transmitted with the plain-text management information in addition to the encrypted hash value.

Using this construction, by decrypting the received encrypted packet numbers using the public key Ka and checking the packet numbers, the relay server EX can determine whether or not all IP packets have arrived and no duplicate IP packets have arrived. As a result, the loss or retransmission of IP packets can be detected on the relay server EX.

B4. Variation 4

In the above embodiment, SSL encryption is used for transmission of the management information from the relay server EX to the management server SV, but the present invention is not limited to this implementation. For example, it is acceptable if a common key is stored in advance in both the memory 304 of the relay server EX and the memory 204 of the management server SV, the management information is encrypted on the relay server EX using this common key and sent to the management server SV, and the management information encrypted using the common key is decrypted on the management server SV.

B5. Variation 5

In the above embodiment, the hash function used on the custom network board CNB, relay server EX and monitoring device ME is MD5, but a different hash function may be used, such as the SHA-1 (Secure Hash Algorithm) or SHA-2 function.

B6. Variation 6

In the above embodiment, the device management system 1000 includes a printer PRT, but it may include, instead of or in addition to a printer, a scanner, facsimile machine, copier or other device that may be connected to a network.

B7. Variation 7

In the above embodiment, the custom network board CNB, relay server EX and management server SV are realized via software, but they may be realized via hardware, and the components realized via hardware may be realized via software.

What is claimed is:

1. A device management system for managing a device based on management information contained therein, comprising:

a device monitoring unit comprising a first processor and configured to possess a first key for encryption and to obtain management information from a device;

a relay server comprising a second processor and configured to be coupled to the device monitoring unit over a network and to possess a second key used for decryption that is paired with the first key; and a management server, comprising a third processor and coupled to the relay server over a network configured to manage the device based on the management information, wherein the device monitoring unit obtains the management information from the device, calculates a hash value based on the obtained management information, assigns a packet number in sequence encrypts the hash value and the packet number by the first key encapsulates the obtained management information, the encrypted hash value and the encrypted packet number in data packets and transmits the data packets to the relay server the obtained management information encapsulated in the data packets is unencrypted, upon receiving the data packet, the relay server decrypts the encrypted hash value and the encrypted packet number in each data packet by the second key and determines whether or not the received management information has been tampered with based on the decrypted hash value and the decrypted packet number, and if it is determined that the management information has not been tampered with based on the decrypted hash value and the decrypted packet number, the relay server encrypts and transmits to the management server the management information.

2. The device management system according to claim 1, wherein where it is determined that the received management information has been tampered with, the relay server transmits to the management server information indicating that tampering has occurred.

3. The device management system according to claim 1, further including:

a monitoring device configured to capture data packets flowing through the network and obtain information included in the captured data packets, wherein the monitoring device possesses the second key;

the monitoring device captures from the network data packets that were transmitted from the device to the relay server to thereby obtain the management information, the encrypted hash value, and the encrypted packet number, and the monitoring device decrypts the encrypted hash value and the encrypted packet number using the second key, and determines whether or not the received management information has been tampered with based on the decrypted hash value and the decrypted packet number.

4. The device management system according to claim 1, wherein the first key is a secret key using a public key encryption method, and the second key is a public key paired with the secret key.

5. The device management system according to claim 1, wherein the device monitoring unit is detachably mounted to the device.

6. A relay server coupled over a network to a management server managing a device based on management information contained in the device, and to a device monitoring unit, obtaining the management information from the device and transmitting data packets to the relay server, the relay server comprising:

a receiving unit configured to receive the data packets, wherein the data packets include the obtained management information, encrypted hash value and encrypted packet number, wherein the obtained management information is unencrypted, wherein the encrypted hash value is calculated based on the obtained management information and encrypted by a first key by the device monitoring unit, wherein the encrypted packet number is assigned in sequence by the device monitoring unit and encrypted by the first key by the device monitoring unit;

a second key used for decryption that is paired with the first key;

a decryption processor configured to, upon receiving each data packet, decrypt the encrypted hash value and the packet number in each data packet by the second key and to determine whether or not the received management information has been tampered with based on the decrypted hash value and the decrypted packet number, an encryption processor configured to, if it is determined that the management information has not been tampered with based on the decrypted hash value and the decrypted packet number, encrypt the received management information; and a transmission unit configured to transmit the encrypted management information to the management server.

7. A method for transmitting management information to a management server that manages a device based on the management information contained in the device, comprising the steps of:

providing a device monitoring unit comprising at least one processor and which obtains management information from the device, a management server, and a relay server coupled over a network to the device monitoring unit and the management server;

obtaining management information via the device monitoring unit, calculating a hash value based on the obtained management information, assigning a packet number in sequence, encrypting the hash value and the packet number by the first key, encapsulating the obtained management information, the encrypted hash value and the encrypted packet number in data packets, and transmitting the data packets to the relay server, wherein the obtained management information encapsulated in the data packets is unencrypted;

upon receiving the data packets from the device monitoring unit, decrypting the encrypted hash value and the encrypted packet number in each data packet by the second key and determining whether or not the received management information has been tampered with based on the decrypted hash value and the decrypted packet number; and if it is determined that the management information has not been tampered with based on the decrypted hash value and the decrypted packet number, encrypting and transmitting via the relay server the management information received from the device monitoring unit to the management server after encrypting the management information.

8. A non-transitory computer readable recording medium which stores a computer program thereon which causes a computer to obtain management information of a device from a device monitoring unit and to transmit data packets to a management server, the computer program comprising:

a first program for causing a computer to receive the data packets, wherein the data packets include obtained management information, encrypted hash value and encrypted packet number, wherein the obtained management information is unencrypted, wherein the encrypted hash value is calculated based on the obtained management information and encrypted by a first key by the device monitoring unit, wherein the encrypted packet number is assigned in sequence by the device monitoring unit and encrypted by the first key by the device monitoring unit;

a second program for causing the computer to decrypt the encrypted hash value and the packet number in each data packet by a second key used for decryption that is paired with the first key and to determine whether or not the received management information has been tampered with based on the decrypted hash value and the decrypted packet number upon receiving each data packet, a third program for causing the computer to encrypt the received management information, if it is determined that the management information has not been tampered with based on the decrypted hash value and the decrypted packet number;

and a fourth program for causing the computer to transmit the encrypted management information to the management server.

* * * * *